(12) United States Patent
Tang et al.

(10) Patent No.: US 11,788,664 B1
(45) Date of Patent: Oct. 17, 2023

(54) INTELLIGENT MAINTENANCE AND REPAIR ROBOT FOR SMALL DIAMETER AND SMALL FLOW OIL AND GAS PIPELINES AND METHOD THEREOF

(71) Applicant: Southwest Petroleum University, Chengdu (CN)

(72) Inventors: Yang Tang, Chengdu (CN); Wudi Zhang, Chengdu (CN); Shouhong Ji, Hangzhou (CN); Jinzhong Wang, Tangshan (CN); Mingbo Wang, Chengdu (CN); Chenglin Wang, Shanghai (CN); Qiang Wang, Chengdu (CN); Guorong Wang, Chengdu (CN); Li Gu, Chengdu (CN); Wei Zhang, Korla (CN); Junkai Zhu, Korla (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/323,989

(22) Filed: May 25, 2023

(30) Foreign Application Priority Data

Aug. 3, 2022 (CN) .......................... 202210927144.6

(51) Int. Cl.
*F16L 55/18* (2006.01)
*F16L 55/32* (2006.01)
(Continued)

(52) U.S. Cl.
CPC ............... *F16L 55/32* (2013.01); *F16L 55/44* (2013.01); *F16L 2101/60* (2013.01)

(58) Field of Classification Search
CPC ........ F16L 55/32; F16L 55/44; F16L 2101/60
(Continued)

(56) References Cited

U.S. PATENT DOCUMENTS

| 4,854,384 A * | 8/1989 | Campbell ............... F16L 55/32 |
| | | 166/134 |
| 4,875,615 A * | 10/1989 | Savard .................... B23K 9/325 |
| | | 29/402.13 |

(Continued)

FOREIGN PATENT DOCUMENTS

| CN | 105570601 A | 5/2016 |
| CN | 206229793 U | 6/2017 |

(Continued)

*Primary Examiner* — James F Hook

(57) ABSTRACT

An intelligent maintenance and repair robot for small diameter and small flow oil and gas pipelines, including a frame, a speed control mechanism, a braking mechanism, an anchoring mechanism, and a sealing mechanism; the speed control mechanism is composed of a motor, rotor, etc; the braking mechanism is composed of a braking rubber cylinder and a first extrusion ring; the anchoring mechanism is composed of a rubber conical cylinder, slips, etc; and the sealing mechanism is composed of a sealing rubber cylinder and a second extrusion ring. The second extrusion ring is driven by a hydraulic rod to press the sealing rubber cylinder, causing it to expand and block the pipe wall to achieve sealing. The intelligent maintenance and repair robot inside the pipeline has the characteristics of good speed control response, wide speed range, strong ability to pass bends, stable braking process, and high sealing reliability.

6 Claims, 11 Drawing Sheets

(51) Int. Cl.
 *F16L 55/44* (2006.01)
 *F16L 101/60* (2006.01)
(58) Field of Classification Search
 USPC .............................................. 138/97, 90, 89
 See application file for complete search history.

(56) References Cited

U.S. PATENT DOCUMENTS

| | | | | |
|---|---|---|---|---|
| 5,924,454 | A | * | 7/1999 | Dyck .................. F16L 55/1283 138/90 |
| 6,129,118 | A | * | 10/2000 | Friedrich ............ F16L 55/1283 166/135 |
| 6,190,090 | B1 | | 2/2001 | Campbell et al. |
| 6,752,175 | B1 | | 6/2004 | Willschuetz |

FOREIGN PATENT DOCUMENTS

| | | | |
|---|---|---|---|
| CN | 110792873 | A | 2/2020 |
| CN | 111720652 | A | 9/2020 |
| CN | 112240448 | A | 1/2021 |
| CN | 112815179 | A | 5/2021 |
| CN | 112923162 | A | 6/2021 |

* cited by examiner

INTELLIGENT MAINTENANCE AND REPAIR ROBOT FOR SMALL DIAMETER AND SMALL FLOW OIL AND GAS PIPELINES AND METHOD THEREOF

CROSS-REFERENCE TO RELATED APPLICATIONS

This application claims priority to Chinese Application No. 202210927144.6, filed on May 18, 2022, entitled "INTELLIGENT MAINTENANCE AND REPAIR ROBOT FOR SMALL DIAMETER AND SMALL FLOW OIL AND GAS PIPELINES AND METHOD THEREOF". These contents are hereby incorporated by reference.

TECHNICAL FIELD

The present disclosure relates to the field of oil and gas pipeline repair and sealing technology, in particular to an intelligent maintenance and repair robot for small diameter and small flow oil and gas pipelines and a method thereof.

BACKGROUND

Oil and gas energy remains a necessary energy source for strategic energy reserves in various countries, and the transportation of oil and gas is an essential process. The transportation of oil and gas energy such as crude oil, refined oil, and natural gas mainly uses pipeline transportation. As a result, pipeline transportation has developed rapidly, especially the oil and gas pipelines with small flow and small diameter used for refined oil and gas transportation have been widely used, with a large number of kilometers. This type of oil and gas pipeline may be damaged by various uncertain factors in the external environment for a long time, therefore, maintenance and emergency repair operations are essential. In current, manual sealing and repair are commonly used in pipeline maintenance and emergency repair operations, but work efficiency is low and the cost is high in this way. In the maintenance and emergency repair operations of pipelines, the pipeline maintenance and emergency repair sealing robot first enters the pipeline from the pig launcher, runs inside the pipeline to the target location that needs to be sealed, and then performs the sealing operation. After the sealing is completed, pipeline maintenance is carried out to reduce the loss of oil and gas resources caused by pipeline leakage and ensure the normal transportation of oil and gas.

However, the existing pipeline maintenance and emergency repair sealing robots are mostly applied to the pipelines with large flow, high pressure, and large diameter, which cannot be used for maintenance and repair operations of small flow and small diameter pipeline, and small diameter and small flow pipeline mainly refer to the urban gas pipelines with diameter DN200-500 mm and flow rate 10.4-168 m3/h. At the same time, existing robots still have many disadvantages in the process of sealing operations, which are mainly shown as follows:

(1) The existing pipeline maintenance and emergency repair sealing robots are mainly composed of traction devices and sealing devices, which are connected by universal connectors. The traction device pulls the sealing device in front, relying on the traction device to change the discharge flow rate, so as to change the pressure drop before and after the device for speed regulation. However, in reality, due to the presence of a sealing device behind the traction device when existing robots operate in pipelines, at this time, the method of controlling the pressure drop before and after the robot to reach the speed regulation is slow, which affects the speed regulation of the robot when going up or down slopes.

(2) The existing pipeline maintenance and emergency repair sealing robots have limited overflow and pressure relief areas, and the range of speed regulation is not wide.

(3) The existing pipeline maintenance and emergency repair sealing robots, due to numerous functional modules, the overall size is too large and length is too long. When the existing robots travel within a pipeline with limited inner diameter, resulting in poor bending ability and overly complex structure.

(4) There are many modules of existing pipeline maintenance and emergency repair sealing robots, which have high overall quality, large inertia during speed regulation, and are prone to vibration during the braking process. Improper braking can cause scratches on the inner wall of the pipeline when slip anchoring, greatly reducing the sealing effect.

In order to meet the demand for intelligent sealing in the maintenance and emergency repair process of oil and gas pipelines with small flow and small diameter, and to solve the problems of slow speed response, narrow speed range, poor bending ability, easy vibration during braking, and low sealing reliability of existing pipeline maintenance and emergency repair sealing robots, it is urgently necessary to provide an intelligent maintenance and emergency repair robot applied to small diameter and small flow pipelines.

SUMMARY (1) Solve the Technical Problems

The object of the present disclosure is to provide an intelligent maintenance and repair robot for small diameter and small flow oil and gas pipeline to solve the problems existing in the use of existing oil and gas pipeline sealing devices. The present disclosure adopts a combination of a frame, a speed control mechanism, a braking mechanism, an anchoring mechanism, and a sealing mechanism to achieve functions such as speed regulation, bending, braking, anchoring, and sealing according to the needs of sealing operation. The present disclosure adopts a combination of the speed control mechanism and the sealing mechanism to solve the problem of untimely response of the existing pipeline maintenance and emergency repair sealing robot when running in the pipeline, because the traction device is connected to the sealing device after the traction device, and the robot speed is controlled by adjusting the robot drainage flow to change the front and rear pressure drop. The present disclosure adopts the method of opening a drainage hole on the outer side of the end face rotary valve to solve the problems of small overflow area, limited speed regulation range, and poor speed regulation effect of traditional overflow and pressure relief devices, such that the discharge channel of the fluid in the pipeline is located on the outer side of the frame, and the bypass-rate is effectively improved. Thus, the speed regulation range is greatly increased, and the utilization rate of internal space in the frame is also improved. The present disclosure has a small overall size and simple structure, solving the problem of poor bending ability of existing pipeline maintenance and emergency repair sealing robots, and effectively improving the bending ability of the robot. The present disclosure has a small overall mass and adopts a method of braking and sealing with a braking rubber cylinder and a sealing rubber cylinder respectively, solving the problems of large inertia, easy vibration during the braking process, and low sealing reliability of the existing pipeline maintenance and repair sealing robot during speed regulation, achieving stable braking and effective sealing.

(2) Technical Solution

The technical solution adopted by the present disclosure to solve its technical problems is: an intelligent maintenance and repair robot for small diameter and small flow oil and gas pipelines, including a frame, a speed control mechanism, a braking mechanism, an anchoring mechanism, and a sealing mechanism, the front end of the frame is provided with eight first bolt connection holes distributed in a circumferential direction, the middle section is provided with a first protrusion plate, a second protrusion plate, and four second installation grooves distributed in a circumferential direction, and the rear end is provided with six second bolt connection holes distributed in a circumferential direction and six first installation grooves distributed in a circumferential direction, the speed control mechanism and a discharge plate disc are connected to the first bolt connection hole at the front end of the frame through bolts, a hydraulic cylinder barrel, an engine compartment, and an engine compartment cover are installed on the discharge plate disc through screws, the hydraulic cylinder barrel and a hydraulic cylinder cover are connected by screws, a communication module and a control module are arranged in front of the first protrusion plate of the frame, the sealing mechanism is arranged behind the first protrusion plate of the frame, and the braking mechanism is arranged behind the second protrusion plate of the frame, a first rubber cup is arranged behind the second bolt connection hole of the frame, and the anchoring mechanism and the first rubber cup are connected to the second bolt connection hole at the rear end of the frame through bolts. The speed control mechanism is composed of a first discharge plate, the second rubber cup, a motor, the engine compartment, the engine compartment cover, a rotor, and a bearing; the first discharge plate and the second rubber cup are connected through bolts, the engine compartment and engine compartment cover are connected through screws, and the motor and rotor are connected through keys, the bearing is arranged in the bearing installation hole in the middle of the first discharge plate, and interference fit is used between the outer ring of the bearing and the bearing installation hole, and between the inner ring of the bearing and the rotating shaft of the motor, the braking mechanism is composed of a braking rubber cylinder and a first extrusion ring, and the first extrusion ring is installed on the first installation groove of the frame and fixed on the hydraulic rod through nuts; the anchoring mechanism is composed of a rubber conical cylinder, a slip, a slip rod, a slip base, and a connection block; the rubber conical cylinder is arranged on the connection block, and the slip is arranged on the rubber conical cylinder; the slip, the slip rod, and the slip base are connected through cylindrical pins, and a fifth bolt connection hole of the slip base and a fourth bolt connection hole of the front end of a connection frame of the second extrusion ring are connected through bolts; and the sealing mechanism is composed of a sealing rubber cylinder and the second extrusion ring, and the second extrusion ring is installed on the second installation groove of the frame and fixed on the hydraulic rod through nuts.

The outer edge of the first drainage plate is provided with eight of the third bolt connection holes distributed in a circumferential direction, an inside of the first drainage plate is provided with drainage holes distributed in a circumferential direction, and the middle of the first drainage plate is provided with the bearing installation hole.

The rotor is provided with four of the second discharge plates distributed in a circumferential direction, and a middle of the rotor is provided with a keyway and a boss.

The first extrusion ring is provided with six of the first reinforcing ribs distributed in a circumferential direction, with a first through-hole in the middle.

The second extrusion ring is provided with four of the second reinforcing ribs distributed in a circumferential direction, a middle of the second extrusion ring is provided with is provided with a second through-hole and the connection frame, and the front end of the connection frame is provided with six of the fourth bolt connection holes.

The slip base is provided with eight of the slip connection grooves distributed in a circumferential direction, connection holes which are symmetric to each other are provided in the slip connection groove, a third through-hole is provided in a middle of the slip base, and six of the fifth bolt connection holes are arranged around the third through-hole in a circumferential direction.

A sealing method of the intelligent maintenance and repair robot for small diameter and small flow oil and gas pipelines, pairs of robots need to be used during the sealing operation of oil and gas pipelines. The working program can be divided into five stages: speed control travel, flexible braking, slip anchoring, rubber sealing and unlocking recovery. The following steps are shown as following:

S1. Speed control travel stage: two identical robots are provided with communication modules and control modules, which enter into the oil and gas pipeline in turn through the pig launcher. The communication module achieves fast and stable transmission of signals inside and outside the pipeline, increasing the response speed and control accuracy of the robot operation. The control module achieves robot braking, anchoring, and sealing actions, it can quickly reach the target position that needs to be sealed. When the robots run in the pipeline, the movement speed of the robots is adjusted within a reasonable range through the speed control mechanism by adjusting the size of the discharge hole. When the robots experience situations such as excessive speed or passing through bends that require the robots to slow down, the motor drives the rotor to rotate, the discharge hole is opened, and the fluid in the pipe moves along the discharge channel on the outer side of the frame, so that the pressure drop at the front and rear ends of the robots is reduced, and its driving force and movement speed are reduced. Conversely, the motor drives the rotor to rotate, the drainage hole is closed, so that the movement speed of the robots increases.

S2. Flexible braking stage: When the two robots are about to reach the target position that needs to be sealed, the motor drives the rotor to rotate, and the drainage hole is opened, and the movement speed of the robots decreases. At the same time, hydraulic oil is injected into the rear side of the piston, which drives the hydraulic rod to move forward. At this time, the first extrusion ring moves forward with the hydraulic rod and press the braking rubber cylinder, the braking rubber cylinder is radially deformed by the force and expands to rub against the inner wall of the pipeline, achieving deceleration braking function.

S3. Slip anchoring stage: hydraulic oil is continuously injected into the rear side of the piston. At this time, the hydraulic rod will drive the slip base to move forward, driving the slip to move forward along the rubber conical cylinder. The slip contacts the inner wall of the pipeline, and as the hydraulic rod continues to move forward, the slip snaps into the inner wall of the pipeline, the two robots are anchored to the front and rear sides of the target position and stopped running in the pipeline.

S4. Rubber sealing stage: at the same time, hydraulic oil is injected into the rear side of the pistons of the two robots. At this time, the second extrusion ring will press the sealing rubber cylinder, so that the sealing rubber cylinder expands radially and fits with the inner wall of the pipeline until the sealing is completed.

S5. Unseal and recovery stage: hydraulic oil is injected into the front side of the pistons of two robots at the same time. The hydraulic rod moves backwards with the piston, and the second extrusion ring moves backwards, such that the sealing rubber cylinder retracts to its original state under reduced force, and the sealing state will be released. Hydraulic oil will continue to be injected, the anchoring state of the robots are released, and driven forward by the fluid in the pipeline. The robots moves to the pig receiving device inside the pipeline to complete the recovery work.

(3) Advantageous Effects

The advantageous effects of the present disclosure are: (1) achieve timely speed control response of the pipeline intelligent maintenance and repair robot; (2) improve the speed regulation range of the pipeline intelligent maintenance and repair robots; (3) improve the ability of the pipeline intelligent maintenance and repair robots to pass through bends; (4) Realize smooth braking process and high sealing reliability of the pipeline intelligent maintenance and repair robots.

Reference numbers in the figures, 1—first discharge plate, 101—discharge hole, 102—third bolt connection hole, 103—bearing installation hole, 2—second rubber cup, 3—discharge plate disc, 4—frame, 401—first bolt connection hole, 402—first installation slot, 403—second installation slot, 404—second bolt connection hole, 405—second protrusion plate, 406—first protrusion plate, 5—communication module, 6—control module, 7—sealing rubber cylinder, 8—second extrusion ring, 801—second reinforcing rib, 802—second through-hole, 803—connection frame, 804—fourth bolt connection hole, 9—braking rubber cylinder, 10—first extrusion ring, 1001—first reinforcing rib, 1002—first through-hole, 11—first rubber cup, 12—rubber conical cylinder, 13—slip, 14—slip rod, 15—slip base, 1501—connection hole, 1502—fifth bolt connection hole, 1503—third through-hole, 1504—slip connection groove, 16—hydraulic rod, 17—connection block, 18—hydraulic cylinder cover, 19—piston, 20—hydraulic cylinder barrel, 21—motor, 22—engine compartment, 23—engine compartment cover, 24—rotor, 240—second discharge plate, 2402—keyway, 2403—boss, 25—bearing.

DETAILED DESCRIPTION OF PREFERRED EMBODIMENTS

Figure 1:
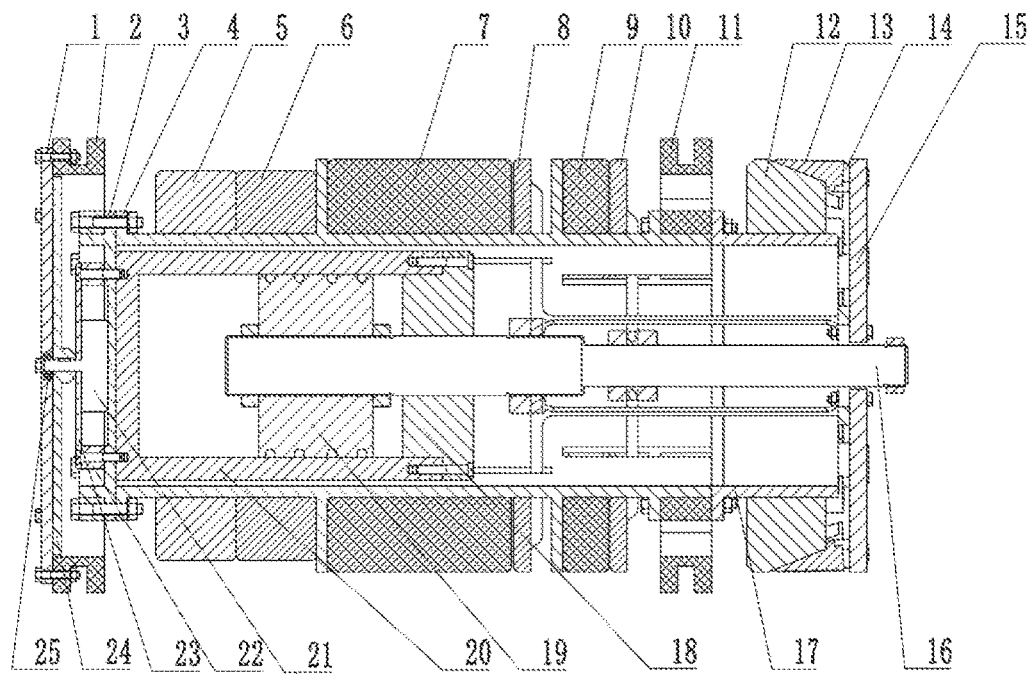
FIG. 1 is a semi-sectional view of the present disclosure.
Figure 2:
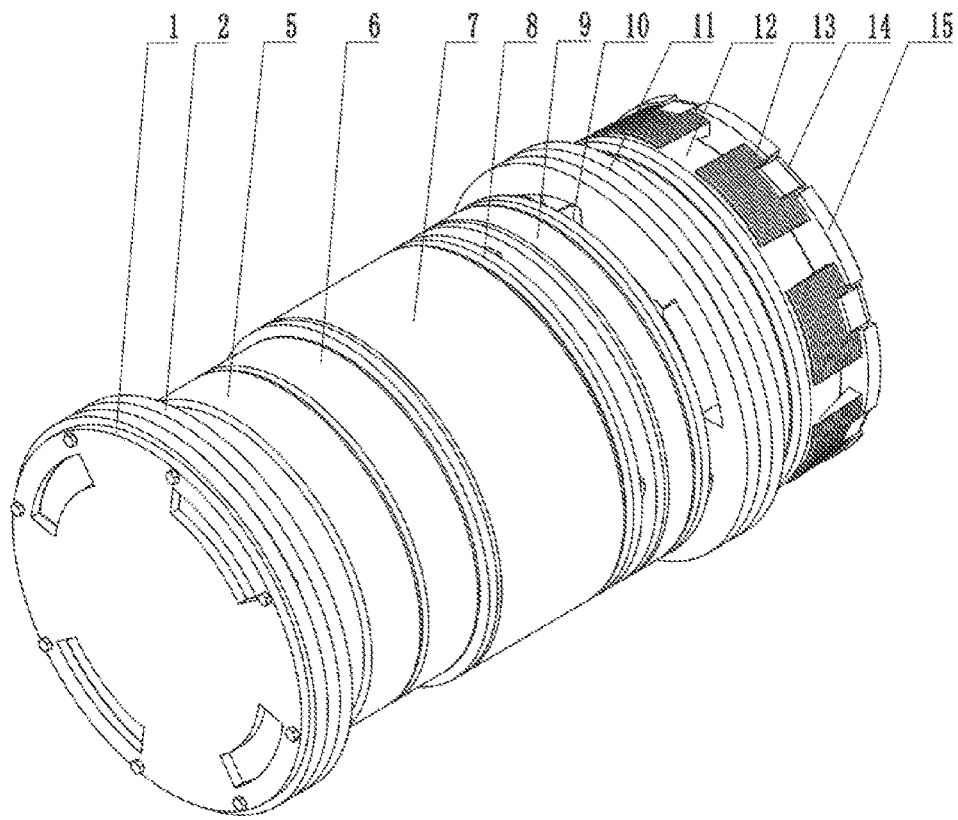
FIG. 2 is a perspective view of the present disclosure.
Figure 3:
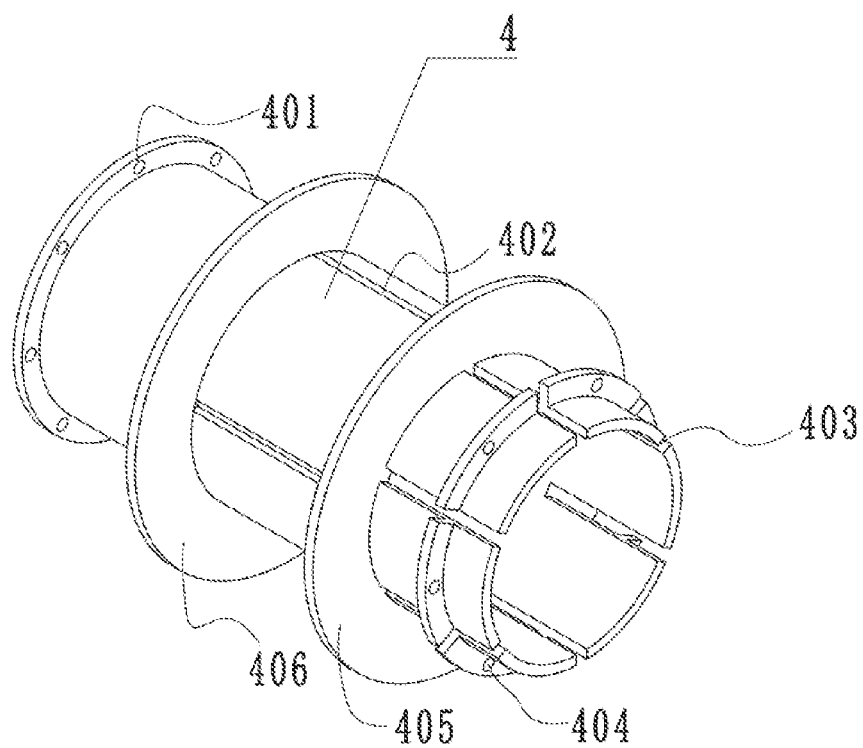
FIG. 3 is a schematic diagram of the frame of the present disclosure.
Figure 4:
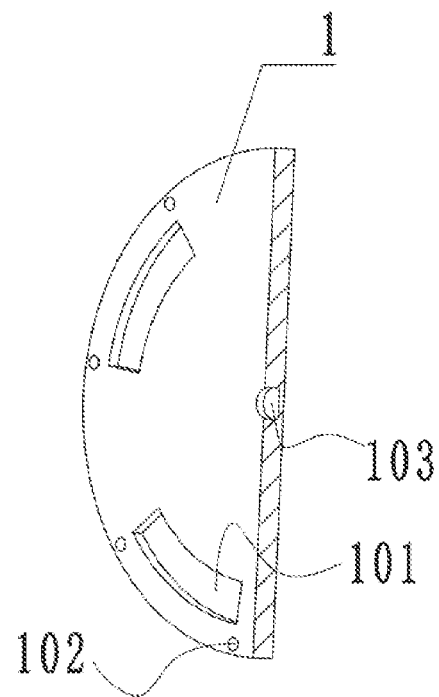
FIG. 4 is a semi-sectional view of the discharge plate of the present disclosure.
Figure 5:
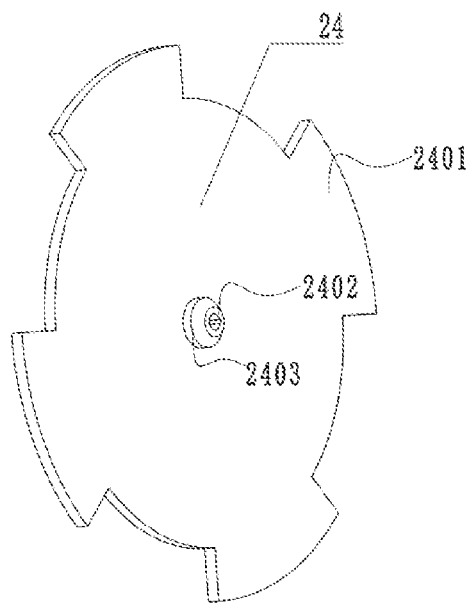
FIG. 5 is a schematic diagram of the rotor of the present disclosure.
Figure 6:
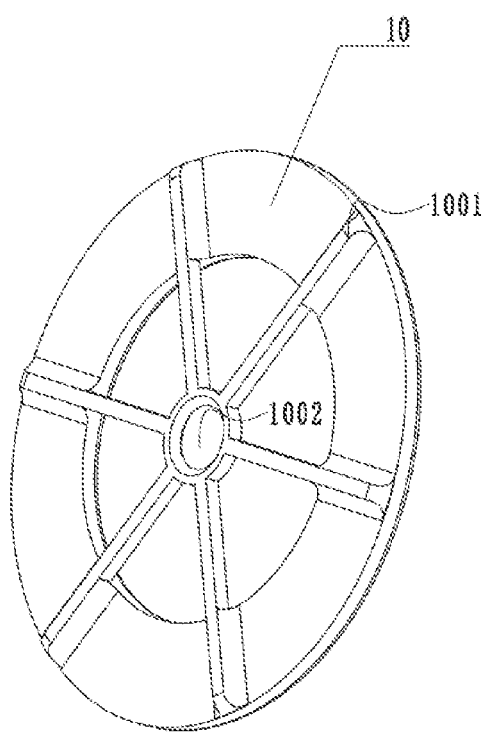
FIG. 6 is a schematic diagram of the first extrusion ring of the present disclosure.
Figure 7:
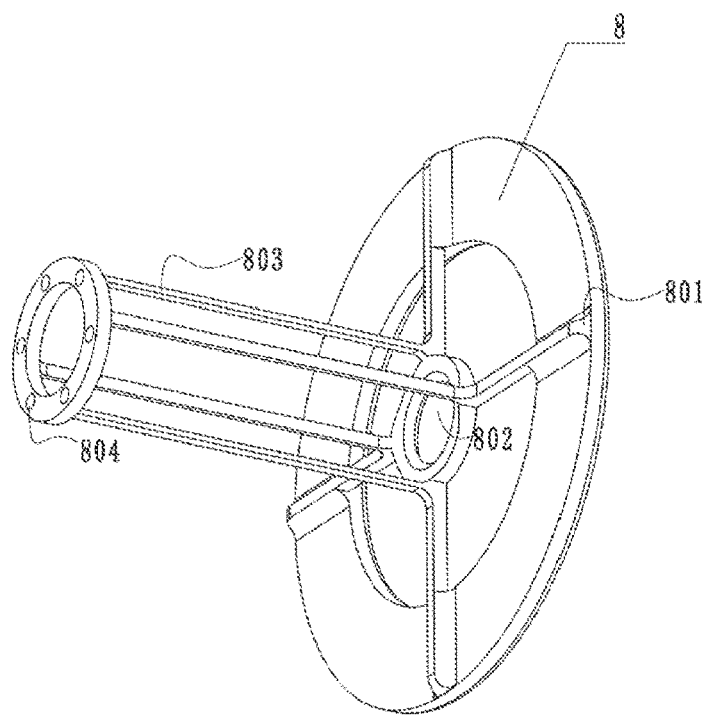
FIG. 7 is a schematic diagram of the second extrusion ring of the present disclosure.
Figure 8:
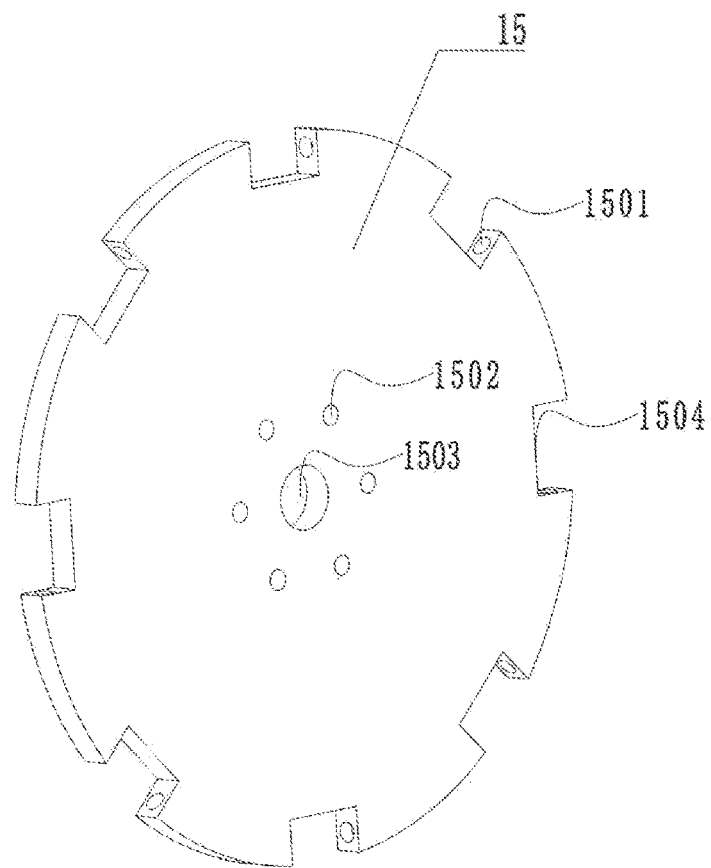
FIG. 8 is a schematic diagram of the slip base of the present disclosure.
Figure 9:
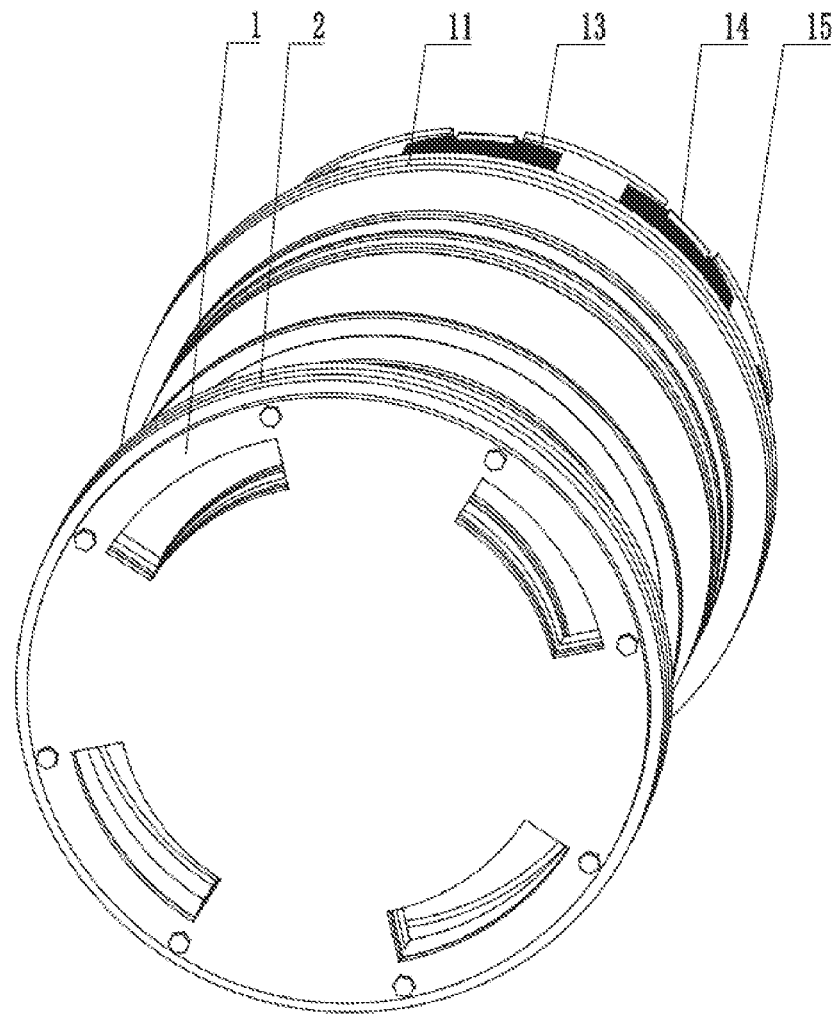
FIG. 9 is a schematic diagram of the valve in the fully open state of the present disclosure.
Figure 10:
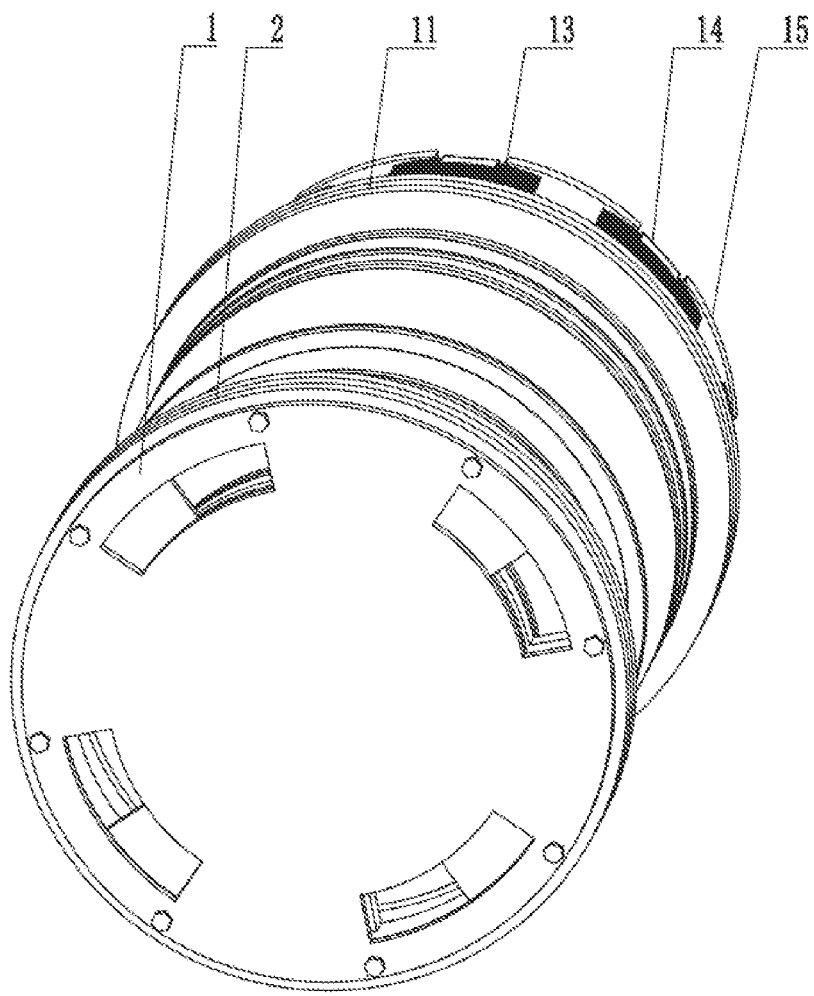
FIG. 10 is a schematic diagram of the valve in the semi-open state of the present disclosure.
Figure 11:
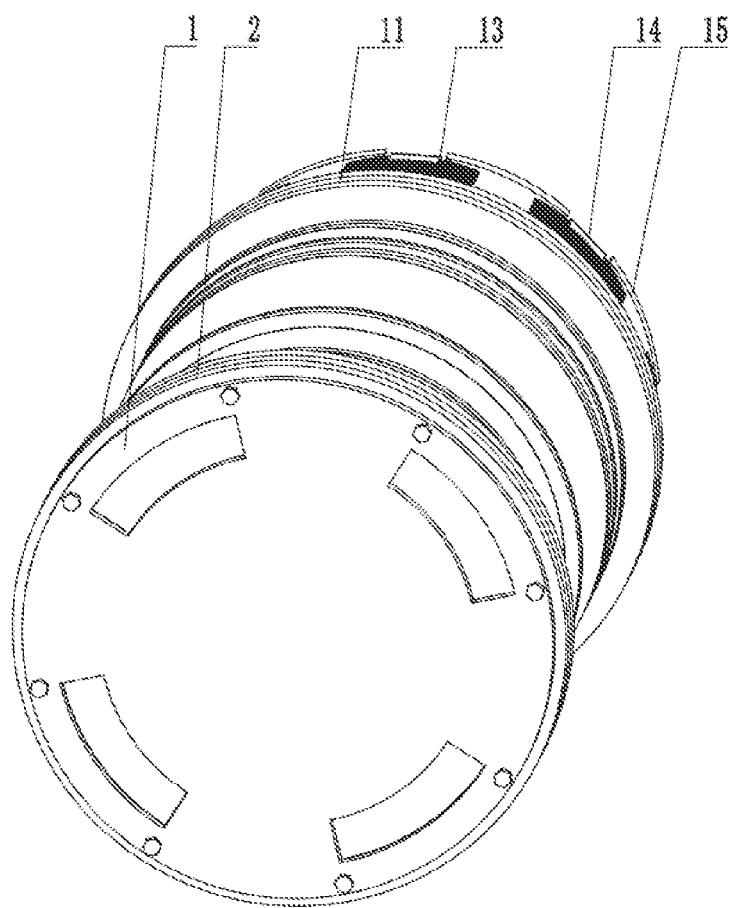
FIG. 11 is a schematic diagram of the valve in the close state of the present disclosure.
Figure 12:
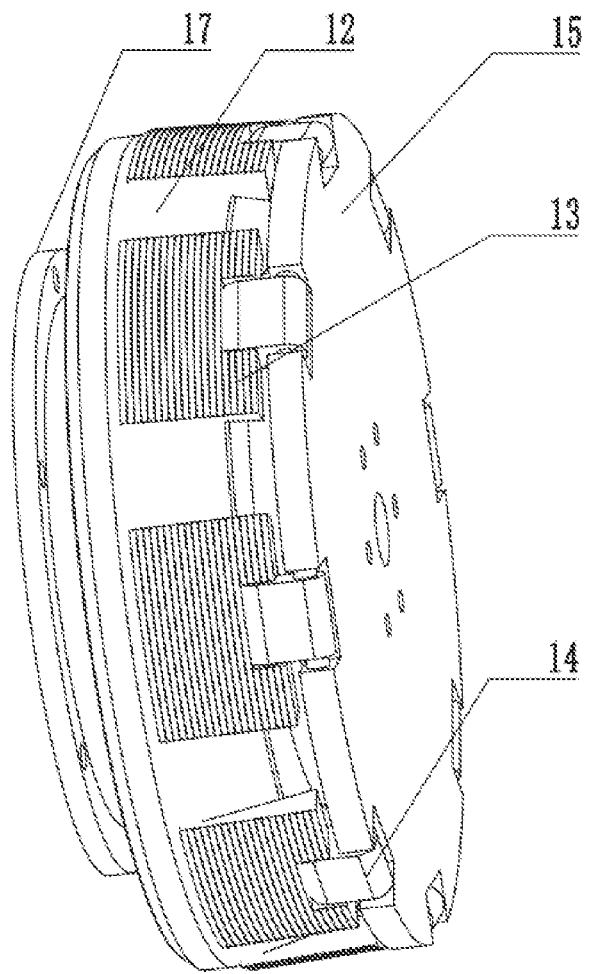
FIG. 12 is a schematic diagram of the anchoring mechanism of the present disclosure.
Figure 13:
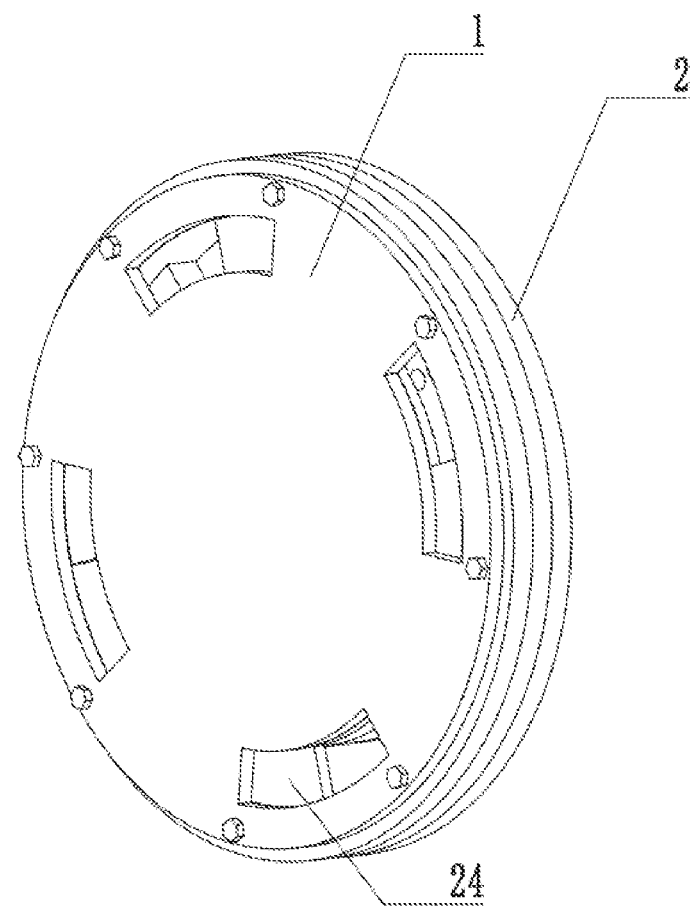
FIG. 13 is a schematic diagram of the speed control mechanism of the present disclosure.
Figure 14:
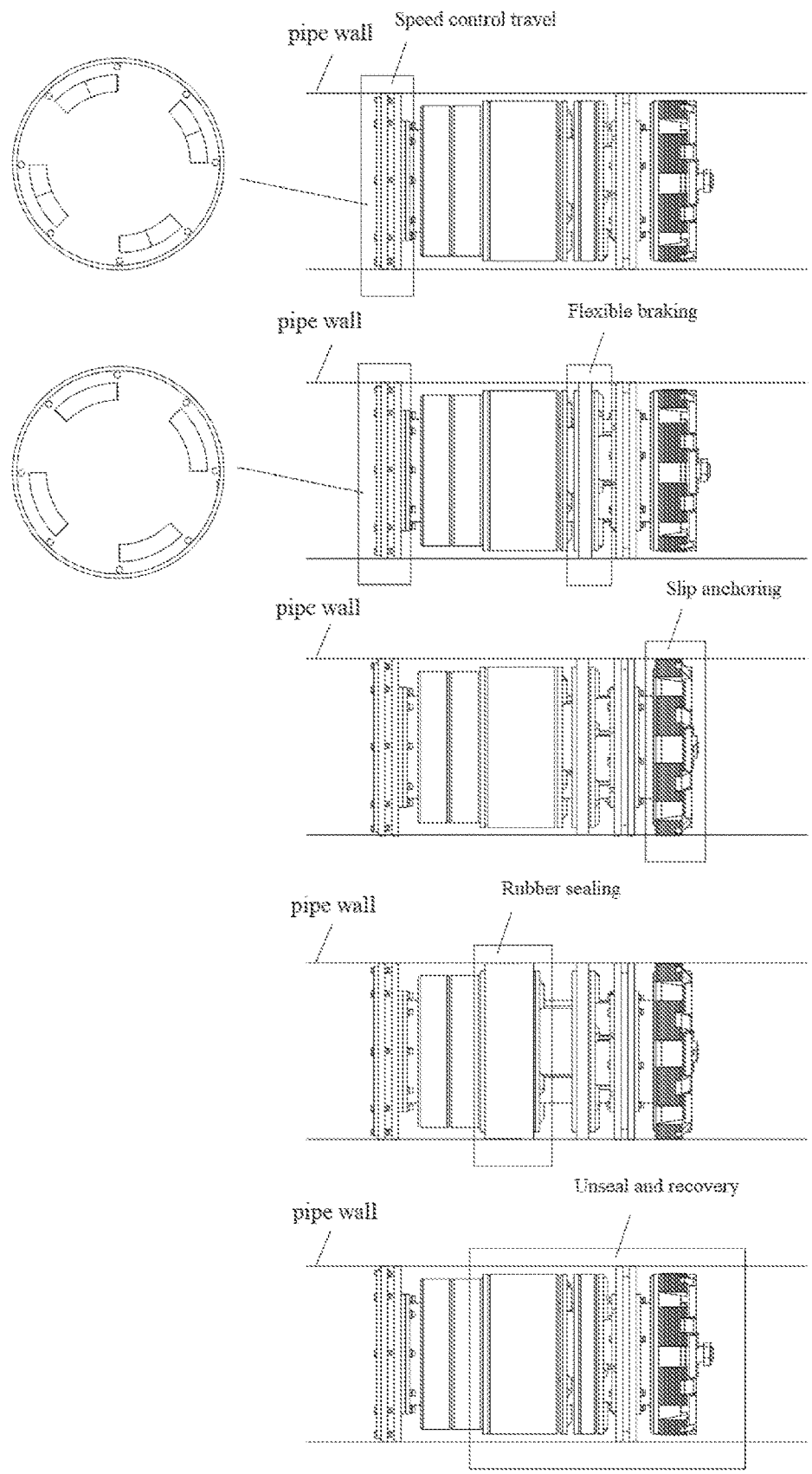
FIG. 14 is a schematic diagram of once self-running process for the present disclosure.
Figure 15:
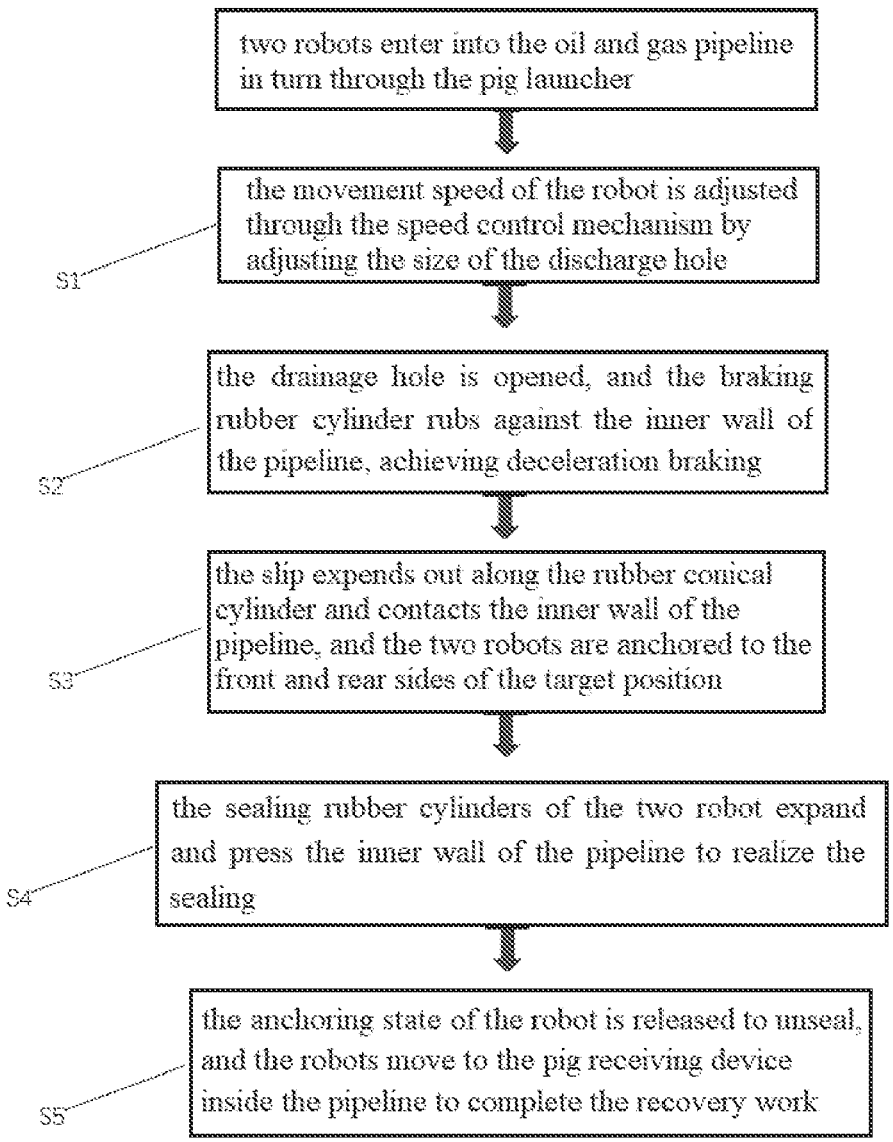
FIG. 15 is a flowchart of the intelligent maintenance and repair method for small diameter and small flow oil and gas pipelines provided by the present disclosure.

The present disclosure is further described in conjunction with the accompanying drawings, and the scope of the present disclosure is not limited to the following description:

As shown in FIGS. 1-14, a intelligent maintenance and repair robot for small diameter and small flow oil and gas pipeline is mainly composed of a frame 4, a speed control mechanism, a braking mechanism, an anchoring mechanism, and a sealing mechanism. The front section of the frame 4 is provided with eight of the first bolt connection holes 401 arranged along circumferential direction, the middle section is provided with a first protrusion plate 406, a second protrusion plate 405, and four second installation grooves 402 arranged along circumferential direction, and the rear end is provided with six of the second bolt connection holes 404 and six of the first installation grooves 403 which are arranged along circumferential direction, the speed control mechanism and the discharge plate disc 3 are connected to the first bolt connection holes 401 at the front end of the frame 4 through bolts. The hydraulic cylinder barrel 20, the engine compartment 22, and the engine compartment cover 23 are installed on the discharge plate disc 3 through screws. The hydraulic cylinder barrel 20 and the hydraulic cylinder cover 18 are connected by screws. The communication module 5 and control module 6 are arranged in front of the first protrusion plate 406 of the frame 4, the sealing mechanism is arranged behind the first protrusion plate 406 of the frame 4, and the braking mechanism is arranged behind the second protrusion plate 405 of the frame 4. The first rubber cup 11 is arranged behind the second bolt connection hole 404 of the frame 4, and the anchoring mechanism and the first rubber cup 11 are connected to the second bolt connection hole 404 at the rear end of the frame 4 through bolts. The speed control mechanism is composed of a discharge plate 1, a second rubber cup 2, a motor 21, an engine compartment 22, an engine compartment cover 23, a rotor 24, and a bearing 25. The discharge plate 1 and the second rubber cup 2 are connected by bolts, and the engine compartment 22 and the engine compartment cover 23 are connected by screws, the motor 21 is connected with the rotor 24 through a key, and the bearing 25 is arranged in the bearing installation hole 103 in the middle of the drainage plate 1. The interference fit is used between the outer ring of the bearing 25 and the bearing installation hole 103, and also used between the inner ring of the bearing 25 and the rotating shaft of the motor 21. The braking mechanism is composed of a braking rubber cylinder 9 and a first extrusion ring 10. The first extrusion ring 10 is installed on the first installation groove 403 of the frame 4 and fixed on the hydraulic rod 16 through a nut. The anchoring mechanism is composed of a rubber conical cylinder 12, slips 13, slip rods 14, a slip base 15, and a connection block 17. The rubber conical cylinder 12 is arranged on the connection block 17, the slip 13 is arranged on the rubber conical cylinder 12, and the slip 13, the slip rod 14, and the slip base 15 are connected through cylindrical pins. And the fifth bolt connection hole 1502 of the slip base 15 and the fourth bolt connection hole 804 at the front end of the connection frame of the second extrusion ring 8 are connected through bolts. The sealing mechanism is composed of a sealing rubber cylinder 7 and a second extrusion ring 8, and the second extrusion ring 8 is installed on the second installation groove 402 of the frame 4 and fixed on the hydraulic rod 16 through a nut.

The outer edge of the discharge plate 1 is provided with eight of the third bolt connection holes 102 arranged in the circumferential direction, four of the circumferential discharge holes 101 are provided inside the discharge plate 1, and the middle of the discharge plate 1 are provided with bearing installation holes 103.

The rotor 24 is provided with four of the discharge plates 2401 arranged in the circumferential direction, with a keyway 2402 and a boss 2403 in the middle.

The first extrusion ring 10 is provided with six of the first reinforcing ribs 1001 arranged in the circumferential direction, with a first through-hole 1002 in the middle.

The second extrusion ring 8 is provided with four of the second reinforcing ribs 801 arranged in the circumferential direction, a second through-hole 802 and a connection frame 803 are arranged at the middle end of the second extrusion ring 8, and six of the fourth bolt connection holes 804 are arranged at the front end of the connection frame.

The slip base 15 is provided with eight of the slip connection grooves 1504 in circumferential direction, there are connection holes 1501 which are symmetric to each other in each of the slip connection grooves 1504, a third through-hole 1503 is provided in the middle of the slip base 15, and six of the fifth bolt connection holes 1502 are arranged around the third through-hole along circumferential direction.

The working process of the present disclosure is as follows:

During normal operation, two intelligent maintenance and repair robots for oil and gas pipeline with small diameter and small flow are provided with communication modules 5 and control modules 6, which enter into the oil and gas pipeline in turn through the pig launcher. The communication module 5 achieves fast and stable transmission of signals inside and outside the pipeline, increasing the response speed and control accuracy of the robot operation. The control module 6 achieves robot braking, anchoring, and sealing actions, it can quickly reach the target position that needs to be sealed. At this moment, the drainage hole 101 of the speed control mechanism at the front end of the robot is completely closed, and the robot accelerates along the pipeline towards the target position that needs to be sealed under the pressure drop at the front and rear ends of the device. When the robot experiences situations such as excessive speed or passing through bends that require the robot to slow down, the motor 21 drives the rotor 24 to rotate, the discharge hole 101 is opened, and the fluid in the pipeline moves along the discharge channel on the outer side of the frame 4, such that the pressure drop at the front and rear ends of the robot is reduced, and its driving force and movement speed are reduced. When the robot speed is too low and needs to be accelerated, the motor 21 drives the rotor 24 to rotate, the discharge hole 101 is closed, so that the discharge channel is closed, the pressure drop at the front and rear ends of the robot is increased, and its driving force and movement speed increase. When two robots are running in the pipeline, their movement speed is adjusted within a reasonable range through the speed control mechanism by adjusting the size of the discharge hole 101. When the two robots are about to reach the target position that needs to be sealed, the motor 21 drives the rotor 24 to rotate, and the drainage hole 101 is opened such that the driving force of the robot decreases, and the movement speed decreases. At the same time, hydraulic oil is injected into the rear side of the piston 19, which drives the hydraulic rod 16 to move forward. At this time, the first extrusion ring 10 moves forward with the hydraulic rod 16 and presses the braking rubber cylinder 9, the braking rubber cylinder 9 is radially deformed by the force and expands to rub against the inner wall of the pipeline, achieving deceleration and braking function. Hydraulic oil is continuously injected into the rear side of the piston 19. At this time, the hydraulic rod 16 will drive the slip base 15 to move forward, driving the slip 13 to move forward along the rubber conical cylinder 12. The slip 13 contacts the inner wall of the pipeline, and as the hydraulic rod 16 continues to move forward, the slip 13 snaps into the inner wall of the pipeline, the two robots are anchored to the front and rear sides of the target position and stop running in the pipeline. At the same time, hydraulic oil is injected into the rear side of the pistons 19 of the two robots. At this time, the second extrusion ring 8 will press the sealing rubber cylinder 7, such that the sealing rubber cylinder 7 expands radially and fits with the inner wall of the pipeline until the sealing function is achieved, completing the sealing operation of the robot. After completing the pipeline maintenance operation, hydraulic oil is injected into the front side of the pistons 19 of both robots at the same time, the hydraulic rod 16 will move backwards with the piston 19, and the second extrusion ring 8 moves backwards, such that the sealing rubber cylinder 7 retracts to its original state under reduced force, and the sealing state is released. Hydraulic oil continues to be injected, such that the anchoring state of the robot will be released, and it will be driven forward by the fluid in the pipeline, such that the robot moves to the pig receiving trap inside the pipeline to complete the recovery work.

The invention claimed is:

1. An intelligent maintenance and repair robot for small diameter and small flow oil and gas pipelines, comprising a frame, a speed control mechanism, a braking mechanism, an anchoring mechanism, and a sealing mechanism, wherein a front end of the frame is provided with first bolt connection holes distributed in a circumferential direction, a middle section of the frame is provided with a first protrusion plate, a second protrusion plate, and second installation grooves distributed in a circumferential direction, and a rear end of the frame is provided with second bolt connection holes distributed in a circumferential direction and first installation grooves distributed in a circumferential direction; the speed control mechanism and a discharge plate disc are connected to the first bolt connection holes at the front end of the frame through bolts, a hydraulic cylinder barrel, an engine compartment, and an engine compartment cover are installed on the discharge plate disc through screws, and the hydraulic cylinder barrel and a hydraulic cylinder cover are connected by screws; a communication module and a control module are arranged in front of the first protrusion plate of the frame, the sealing mechanism is arranged behind the first protrusion plate of the frame, the braking mechanism is arranged behind the second protrusion plate of the frame, a first rubber cup is arranged behind the second bolt connection holes of the frame, and the anchoring mechanism and the first rubber cup are connected to the second bolt connection holes at the rear end of the frame through bolts;

wherein the speed control mechanism is composed of a first discharge plate, a second rubber cup, a motor, the engine compartment, the engine compartment cover, a rotor, and a bearing; the first discharge plate and the second rubber cup are connected through bolts, the engine compartment and the engine compartment cover are connected through screws, the motor and the rotor are connected through keys, and the bearing is arranged in a bearing installation hole in a middle of the first discharge plate; a interference fit is used between an outer ring of the bearing and the bearing installation hole, and also used between an inner ring of the bearing and a rotating shaft of the motor;

the braking mechanism is composed of a braking rubber cylinder and a first extrusion ring, and the first extrusion ring is installed on the first installation groove of the frame and fixed on the hydraulic rod through nuts;

the anchoring mechanism is composed of a rubber conical cylinder, slips, slip rods, a slip base, and a connection block; the rubber conical cylinder is arranged on the connection block, and the slips are arranged on the rubber conical cylinder; the slips, the slip rods, and the slip base are connected through cylindrical pins, and fifth bolt connection holes of the slip base and fourth bolt connection holes at a front end of a connection frame of a second extrusion ring are connected through bolts; and the sealing mechanism is composed of a sealing rubber cylinder and the second extrusion ring, and the second extrusion ring is installed on the second installation groove of the frame and fixed on the hydraulic rod through nuts.

2. The intelligent maintenance and repair robot for small diameter and small flow oil and gas pipelines according to claim 1, wherein an outer edge of the first drainage plate is provided with third bolt connection holes distributed in a circumferential direction, an inside of the first drainage plate is provided with drainage holes distributed in a circumferential direction, and a middle of the first drainage plate is provided with the bearing installation hole.

3. The intelligent maintenance and repair robot for small diameter and small flow oil and gas pipelines according to claim 1, wherein the rotor is provided with second discharge plates distributed in a circumferential direction, and a middle of the rotor is provided with a keyway and a boss.

4. The intelligent maintenance and repair robot for small diameter and small flow oil and gas pipelines according to claim 1, wherein the first extrusion ring is provided with first reinforcing ribs distributed in a circumferential direction, and a middle of the first extrusion ring is provided with a first through-hole.

5. The intelligent maintenance and repair robot for small diameter and small flow oil and gas pipelines according to claim 1, wherein the second extrusion ring is provided with second reinforcing ribs distributed in a circumferential direction, a middle section of the second extrusion ring is provided with a second through-hole and the connection frame, and the front end of the connection frame is provided with the fourth bolt connection holes.

6. The intelligent maintenance and repair robot for small diameter and small flow oil and gas pipelines according to claim 1, wherein the slip base is provided with slip connection grooves distributed in a circumferential direction, connection holes which are symmetric to each other are provided in each of the slip connection grooves, a third through-hole is provided in a middle of the slip base, and six of the fifth bolt connection holes are arranged around the third through-hole in a circumferential direction.

\* \* \* \* \*